(12) United States Patent
Ice

(10) Patent No.: US 8,014,153 B2
(45) Date of Patent: Sep. 6, 2011

(54) FLOATING FRONT ENCLOSURE FOR PLUGGABLE MODULE

(75) Inventor: Donald A. Ice, Milpitas, CA (US)

(73) Assignee: Finisar Corporation, Sunnyvale, CA (US)

( * ) Notice: Subject to any disclaimer, the term of this patent is extended or adjusted under 35 U.S.C. 154(b) by 471 days.

(21) Appl. No.: 12/273,069

(22) Filed: Nov. 18, 2008

(65) Prior Publication Data
US 2010/0124030 A1 May 20, 2010

(51) Int. Cl.
H05K 1/14 (2006.01)
H05K 5/00 (2006.01)

(52) U.S. Cl. ........................................ 361/741; 361/802

(58) Field of Classification Search .................. 361/741, 361/756, 802
See application file for complete search history.

(56) References Cited

U.S. PATENT DOCUMENTS

| | | | | |
|---|---|---|---|---|
| 5,767,999 | A * | 6/1998 | Kayner | 398/164 |
| 6,811,413 | B2 * | 11/2004 | Keeble et al. | 439/79 |
| 6,870,746 | B2 * | 3/2005 | Leeson et al. | 361/816 |
| 6,986,679 | B1 * | 1/2006 | Aronson et al. | 439/374 |
| 7,710,734 | B2 * | 5/2010 | Ice et al. | 361/730 |
| 7,843,704 | B2 * | 11/2010 | Chang | 361/802 |
| 7,859,849 | B2 * | 12/2010 | Ice | 361/715 |
| 2008/0137306 | A1 * | 6/2008 | Kim | 361/709 |
| 2010/0039778 | A1 * | 2/2010 | Ice | 361/728 |

FOREIGN PATENT DOCUMENTS
WO WO 2010019912 A2 * 2/2010
* cited by examiner

*Primary Examiner* — Lisa Lea-Edmonds
(74) *Attorney, Agent, or Firm* — Maschoff Gilmore & Israelsen

(57) ABSTRACT

In one example embodiment, a host device includes a front panel, a bezel assembly, a floating PCB, and two host guides. The front panel defines an opening configured to receive a pluggable module in a plugging direction. The bezel assembly defines an opening configured to align with the front panel opening and to receive the pluggable module, the bezel assembly rigidly secured to the front panel. The host guides are rigidly secured to the floating PCB and are configured to guide the pluggable module when it is plugged into the host device. The host guides and bezel assembly operate together to allow the floating PCB to float with respect to the front panel in the plugging direction while remaining substantially aligned with the front panel in directions normal to the plugging direction.

16 Claims, 13 Drawing Sheets

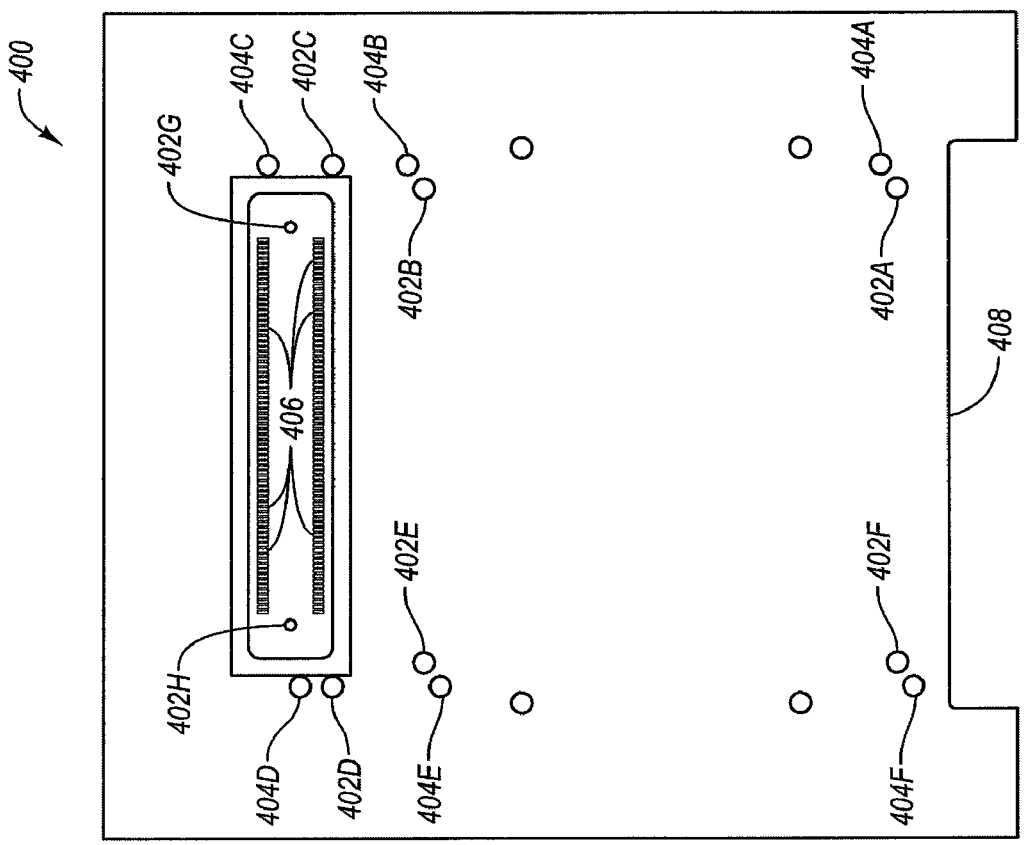
Fig. 4
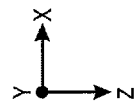

FLOATING FRONT ENCLOSURE FOR PLUGGABLE MODULE

BACKGROUND OF THE INVENTION

1. The Field of the Invention

The present invention generally relates to pluggable electronic and optoelectronic modules and host devices. In particular, some example embodiments relate to a mechanical platform for pluggable electronic and optoelectronic modules and host devices.

2. The Related Technology

Conventional mechanical platforms implemented in optical and electrical networks include a pluggable module configured to be plugged into a host device to convert electrical data signals to optical data signals and vice versa. Specific functionality, dimensions, and/or other functionality of such mechanical platforms are often standardized by a multi-source agreement ("MSA"), such as the X2 MSA, XPAK MSA, and/or XENPAK MSA, for example.

Traditional pluggable modules, including X2, XPAK, and XENPAK form-factor modules, include a narrow channel defined along opposite sides of the module that run the length of the module. Host devices include corresponding narrow guiderails. To plug such a module into a host device, the module channels are aligned with the host guiderails and the module is pushed into the host device, the module channels engaging the host guiderails to ensure proper alignment of the module within the host device. Once plugged in, a module connector in the back of the module and a host connector in the host device provide an electrical interface between the module and the host device.

Additionally, some pluggable modules, like XENPAK form-factor modules, are secured in host devices by two short thumbscrews which engage threaded receptacles in the front panel of the host device. To this end, the module typically includes an oversize module front panel with two flanges that extend outward from opposing sides of the module, one thumbscrew being inserted through each flange. The flanges typically overlap a significant amount of the host front panel to provide enough metal for the thumbscrews to thread into. The overlap is increased by the requirement that the thumbscrews avoid the space behind the module front panel and the host front panel occupied by the module itself and the narrow guiderails of the host device.

As a result of the required overlap, the footprint of the module front panel and flanges extends significantly beyond the footprint of the main body of the module as viewed from the front of the module. Consequently, the maximum number of modules that can be plugged into a single host device is limited by the module front panel and flanges, and not by the main body of the module.

Further, the attachment of traditional pluggable modules to the front panel of the host device can make containment of electromagnetic interference ("EMI") at the back of the module difficult to achieve. Specifically, attaching the module to the front panel of the host device can result in a good EMI seal between the module flange and the host front panel. However, tolerance stack-up in the plugging direction results in a highly variable position of the module connector with respect to the host connector from one module to another such that a conventional elastomeric EMI gasket, which has a limited compression range positioned between the back of the module and the host connector is inadequate for providing EMI containment.

Additionally, the tolerance stack-up is typically compensated for by increasing the length of contacts within the module connector and/or host connector. The increased contact length allows for greater variation in the position of the module connector with respect to the host connector. Additionally, however, the increased contact length increases EMI emissions of each lengthened contact and can result in large contact stubs that extend beyond the points of contact between contacts in the module connector and contacts in the host connector. The large stubs create inductive discontinuities that degrade high speed signal integrity and further exacerbate EMI emissions.

On the other hand, the back of the module can be secured directly to the host connector, rather than securing the module front panel directly to the host front panel, to improve the EMI seal at the interface between the back of the module and the host connector. Such an arrangement would additionally allow shorter contact lengths to be used in the module connector and host connector as tolerance stack-up would not be an issue at that interface. However, the tolerance stack-up would then have to be dealt with at the interface between the module front panel and the host front panel, preventing the module front panel from being directly secured to the host front panel and compromising the EMI seal at that interface.

Additionally, some MSAs specify belly-to-belly configurations where a first module is positioned on top of a host printed circuit board ("PCB") and a second module is positioned upside down on the bottom of the host PCB directly beneath the first module. In such a configuration, the two modules are usually separated by only a few millimeters, or little more than the thickness of the host PCB. The presence of the oversized module front panel in the X2, XENPAK and other pluggable modules precludes belly-to-belly configurations with these modules since the oversized module front panel prevents the modules from being positioned sufficiently close together.

Moreover, thickness tolerances for host PCBs are usually plus or minus ten percent. The resulting large variations in host PCB thickness from one host PCB to the next make it difficult to design host systems that can absorb the variations.

Furthermore, length tolerances for host PCBs can be problematic in conventional platforms where the host PCB is rigidly secured, either directly or indirectly, to the host front panel. For instance, a relatively longer host PCB that is rigidly secured to the host front panel tends to bow the host front panel outwards, while a relatively shorter host PCB that is rigidly secured to the host front panel tends to bow the host front panel inwards.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF THE INVENTION

In general, example embodiments of the invention relate to a mechanical platform for pluggable optoelectronic modules and host devices.

In one example embodiment, a host device for receiving a pluggable module includes a front panel, a bezel assembly, a floating PCB, and first and second host guides. The front panel defines an opening configured to receive the pluggable module in a plugging direction. The bezel assembly defines an opening configured to align with the front panel opening and to receive the pluggable module, the bezel assembly extending from the front and back of the front panel and rigidly secured to the front panel. The floating PCB is disposed behind the front panel. The host guides are rigidly secured to the floating PCB and are configured to guide the pluggable module when it is plugged into the host device. The host guides and bezel assembly operate together to allow the floating PCB to float with respect to the front panel in the plugging direction while remaining substantially aligned with the front panel in directions normal to the plugging direction.

In another example embodiment, a host device for receiving a pluggable module includes a front bezel, a rear bezel rigidly secured to the front bezel, a front panel rigidly secured between the front and rear bezel, a PCB, and host guides rigidly secured to the PCB. The front bezel includes a pair of front bezel guides, each front bezel guide including a guide channel configured to receive a first or second guiderail of the pluggable module inserted through the front bezel in a plugging direction. The rear bezel and front bezel form a first opening configured to receive the pluggable module. The front panel defines a second opening that aligns with the first opening. The PCB is configured to float in the plugging direction with respect to the front panel. The host guides define channels configured to receive the first or second guiderail. The host guides and rear bezel operate together to allow the PCB to float with respect to the front panel in the plugging direction while remaining substantially aligned with the front panel in directions normal to the plugging direction.

Additional features of the invention will be set forth in the description which follows, and in part will be obvious from the description, or may be learned by the practice of the invention. The features of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 4 discloses an example host PCB such as may be employed in the host device of FIG. 1.

DETAILED DESCRIPTION

The principles of the embodiments described herein describe the structure and operation of several examples used to illustrate the present invention. It should be understood that the drawings are diagrammatic and schematic representations of such example embodiments and, accordingly, are not limiting of the scope of the present invention, nor are the drawings necessarily drawn to scale. Well-known devices and processes have been excluded so as not to obscure the discussion in details that would be known to one of ordinary skill in the art.

The embodiments disclosed herein are generally related to a mechanical platform for a pluggable optoelectronic module and a host device that is capable of receiving the pluggable optoelectronic module. The embodiments disclosed herein may be implemented on various types of optoelectronic modules of various operating speeds and various form factors, including, but not limited to, the emerging 100G Form-factor Pluggable ("CFP") Multi-Source Agreement ("MSA") form factor. As used herein, the term "optoelectronic module" includes modules having both optical and electrical components. Examples of optoelectronic modules include, but are not limited to transponders, transceivers, transmitters, and/or receivers. Optoelectronic modules can be used, for instance, in telecommunications networks, local area networks, metro area networks, storage area networks, wide area networks, and the like.

Figure 1:
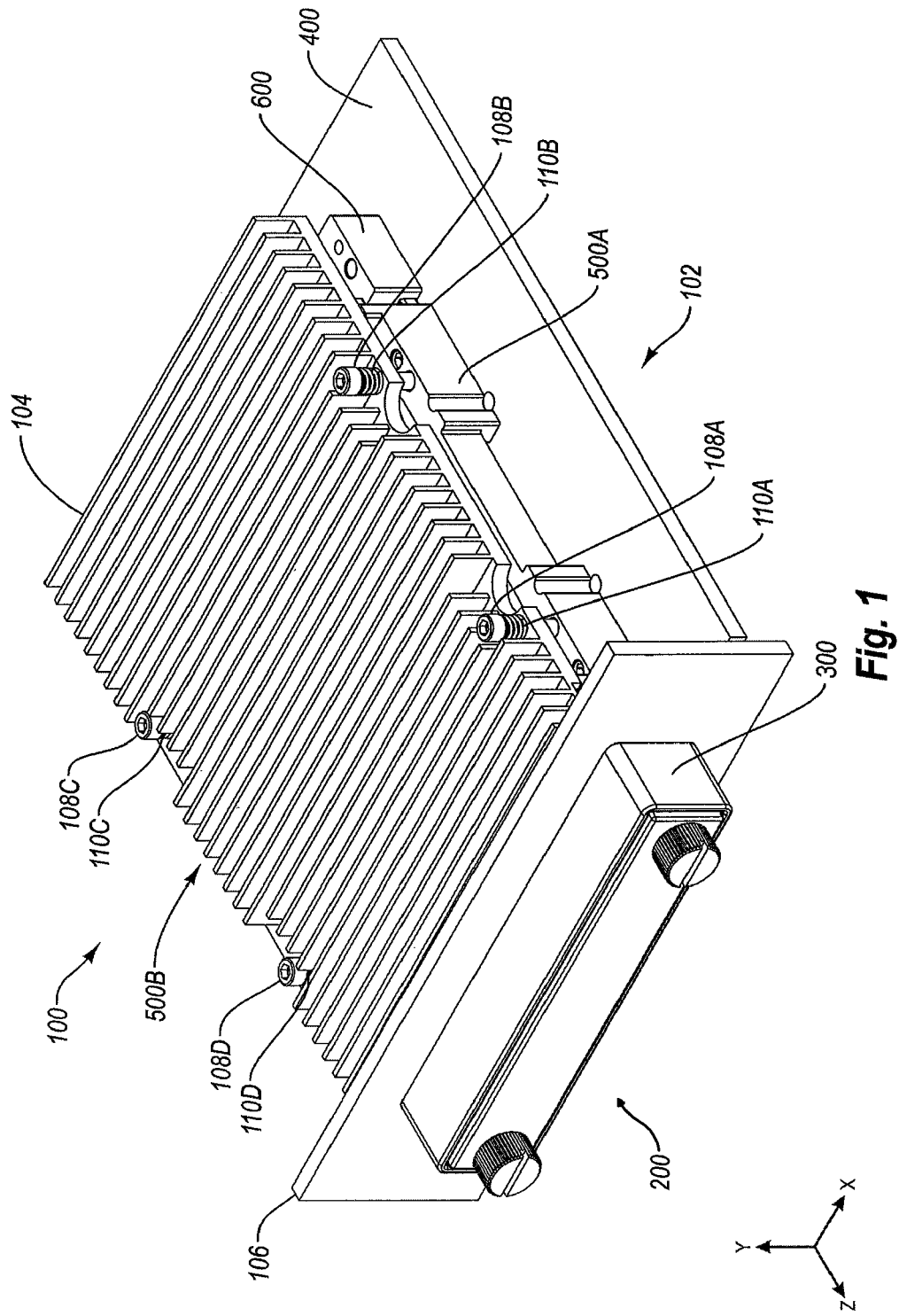
FIG. 1 discloses an example mechanical platform including a host device and a pluggable optoelectronic module.

FIG. 1 illustrates an example mechanical platform 100 according to embodiments of the invention which includes a pluggable optoelectronic module 200 ("module 200") and a host device 102. As shown, the module 200 is configured to be plugged into the host device 102 as will be explained in more detail to follow.

The host device 102 includes a heatsink 104, front panel 106, bezel assembly 300, host printed circuit board ("PCB") 400, host guides 500A, 500B, and host connector 600. In some embodiments, a plurality of shoulder screws 108A-108D removably secure the heatsink 104 to the host device 102. Optionally, each of the shoulder screws 108A-108D can include a compression spring 110A, 110B, 110C or 110D, respectively. The compression springs 110A-110B are configured to bias the shoulder screws 108A-108D upwards (e.g., in the positive y-direction) away from the host guides 500A, 500B. When the shoulder screws 108A-108D are aligned with corresponding tapped holes on host guides 500A and 500B, a user can exert a downward force (e.g., in the negative y-direction) on shoulder screws 108A-108D to overcome the upward bias from compression springs 110A-110D to install the shoulder screws 108A-108D into the corresponding tapped holes on the host guides 500A and 500B. Once installed, the compression springs 110A-110D serve to bias the heatsink 104 against the top surface of the module 200. Although not shown, a thermal pad, thermal film, thermal gel, and/or other thermally conductive material can be placed between the module 200 and heatsink 104 to thermally couple the heatsink 104 to the module 200 and improve the ability of the heatsink 104 to receive and dissipate heat away from the module 200.

I. Pluggable Module

Figure 2:
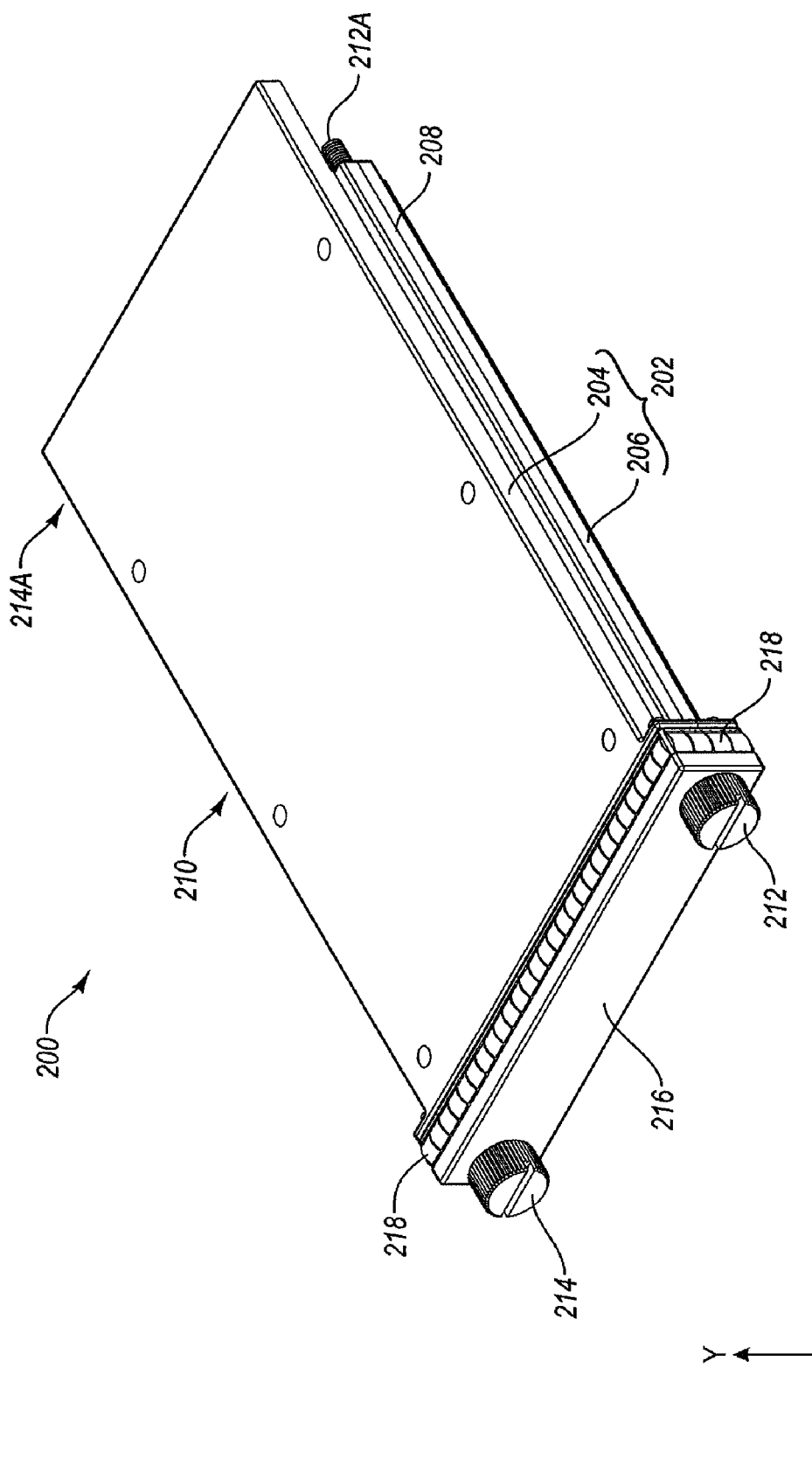
FIG. 2 discloses an example embodiment of a pluggable optoelectronic module.

With combined reference to FIGS. 1 and 2, additional aspects of an example module 200 are disclosed. As shown, the module 200 includes a shell assembly 202 comprising top shell 204 and bottom shell 206. Alternately, a monolithic shell can be implemented instead of a shell assembly 202. The top and/or bottom shell 204, 206 can be made using any reasonable material known in the art.

The shell assembly 202 is configured to enclose a module PCB (not shown), which can include various electronic, optical, and/or optoelectronic components coupled thereto. A module connector (not shown) coupled to the module PCB is configured to mate with a corresponding host connector 600.

Guiderails 208, 210 protrude laterally at the junction of the top shell 204 and bottom shell 206 from opposite sides of the module 200 and extend along the length of the module 200. However, it is not required that the guiderails 208, 210 protrude laterally at the junction of the top shell 204 and bottom shell 206. For instance, the guiderails can protrude from opposite sides of the module 200 above and/or below the junction of the top and bottom shells 204, 206 or from opposite sides of a module that includes a monolithic shell rather than a shell assembly 202. The guiderails 208, 210 are configured to engage channels on the bezel assembly 300 and host guides 500A, 500B, as will be discussed in more detail below.

Thumbscrews 212 and 214 are housed within guiderails 208, 210 and protrude through module front panel 216 at the front of the module 200 and extend along the full length of the module 200. A threaded end 212A of thumbscrew 212 extends from the back of the module 200 for mating with the host connector 600; thumbscrew 214 similarly includes a threaded end 214A (not shown) for mating with the host connector 600.

In some embodiments, each thumbscrews 212 and 214 includes a compression spring (not shown) located near the head of the thumbscrews 212 and 214 and housed within the guiderails 208, 210. The compression springs are configured to bias the thumbscrews 212 and 214 in an outward position, which may be approximately 6 millimeters ("mm") in some embodiments. Prior to plugging the module 200 into the host device 102, the threaded ends 212A and 214A of thumbscrews 212 and 214 are retracted into the guiderails 208 and 210 due to the outward bias force exerted by the compression springs.

When a user desires to plug the module 200 into the host device 102, the user aligns the guiderails 208, 210 with corresponding channels on the bezel assembly 300 and host guides 500A, 500B and pushes the module 200 into the host device 102. After insertion of the module 200, the user can exert an inward pressure on the heads of the outwardly biased thumbscrews 212 and 214 to overcome the outward biasing effect of the compression springs, which causes the threaded ends 212A and 214A to enter corresponding threaded holes in the host connector 600. The user can then tighten the thumbscrews 212, 214 to securely fasten the module 200 into host device 102.

The module 200 additionally includes an electromagnetic interference ("EMI") collar 218 surrounding the front of the module 200. The EMI collar 218 operates in conjunction with host bezel assembly 300 to create an EMI shield around the front of the module 200 when plugged into the host device 102.

Optionally, the top shell 204 of module 200 can include an integrated low profile heatsink for low profile, low power applications. In some embodiments, the host heatsink 104 is omitted from the host device 102 when the module 200 includes a top shell 204 with integrated low profile heatsink.

The module 200 is only one example of a pluggable optoelectronic module that can be implemented in the mechanical platform 100 of FIG. 1. Additional aspects regarding pluggable optoelectronic modules that can be implemented in the mechanical platform 100 of FIG. 1 are disclosed in U.S. patent application Ser. No. 12/203,027, filed Sep. 2, 2008 and entitled CFP MECHANICAL PLATFORM (referred to herein as "the '027 application"). The '027 application is herein incorporated by reference in its entirety.

II. Host

As already explained above, the host device 102 of FIG. 1 includes a front panel 106, bezel assembly 300, host PCB 400, host guides 500A, 500B, and host connector 600. Briefly, the front panel 106 defines an opening configured to receive the module 200 in a plugging direction. As used herein, "plugging direction" refers to the direction in which the module 200 is plugged into the host device 102. In the example of FIG. 1, the plugging direction corresponds to the negative z-direction.

The bezel assembly 300 defines an opening configured to align with the front panel 106 opening and to receive the module 200. The bezel assembly 300 extends forwards from the front of the front panel 106 and backwards from the back of the front panel 106 at the front panel 106 opening. As will be described in greater detail below, the bezel assembly 300 can include a front bezel and a rear bezel, the front panel 106 being rigidly secured between the front bezel and rear bezel.

The host PCB 400 is a floating PCB configured to float with respect to the front panel 106 and bezel assembly 300 in the plugging direction while remaining aligned with the front panel 106 and bezel assembly 300 in directions normal to the plugging direction, e.g., in the x- and y-directions. In other words, the PCB is not rigidly secured to the front panel 106 or bezel assembly 300 and can move with respect to the front panel 106 and bezel assembly 300 in the plugging direction. Although the host PCB 400 is described herein as floating with respect to the front panel 106 and bezel assembly 300 in the plugging direction, it can alternately or additionally be said that the front panel 106 and bezel assembly 300 float with respect to the host PCB 400 in the plugging direction.

The host guides 500A, 500B are configured to guide the module 200 when plugged into the host device 102 and can each include a channel configured to receive the guiderails 208, 210 of module 200. The host guides 500A, 500B are rigidly secured to the host PCB 400. In some embodiments, the host guides 500A, 500B operate together with the bezel assembly 300 to permit the host PCB 400 and host guides 500A, 500B to float with respect to the front panel 106 and bezel assembly 300 in the plugging direction while remaining substantially aligned with the front panel 106 and bezel assembly 300 in directions normal to the plugging direction. Further, in some embodiments the host guides 500A, 500B are substantially identical to each other except in orientation relative to the host PCB 400.

A. Bezel Assembly

With combined reference to FIGS. 1-3E, additional aspects of an example bezel assembly 300 are disclosed. As shown in the exploded view of FIG. 3A, the bezel assembly 300 includes a front bezel 302, electromagnetic interference ("EMI") gasket 304, and rear bezel 306. The front bezel 302 and rear bezel 306 each define an opening 308A, 308C, respectively (collectively referred to as "opening 308") through which the module 200 can be plugged into the host device 102.

Figure 3A:
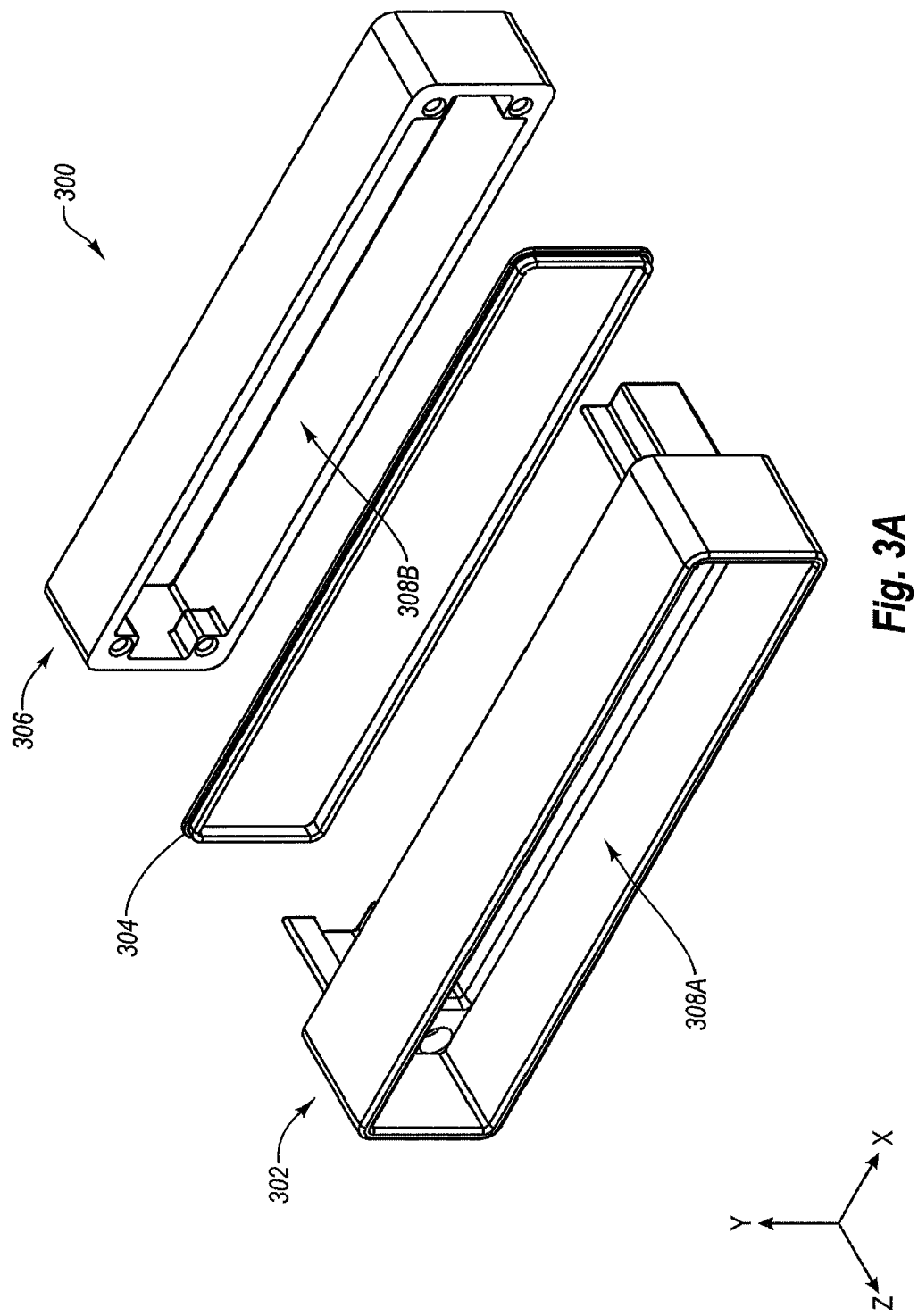
FIGS. 3A-3E disclose an example bezel assembly that can be implemented in the host device of FIG. 1.
Figure 3B:
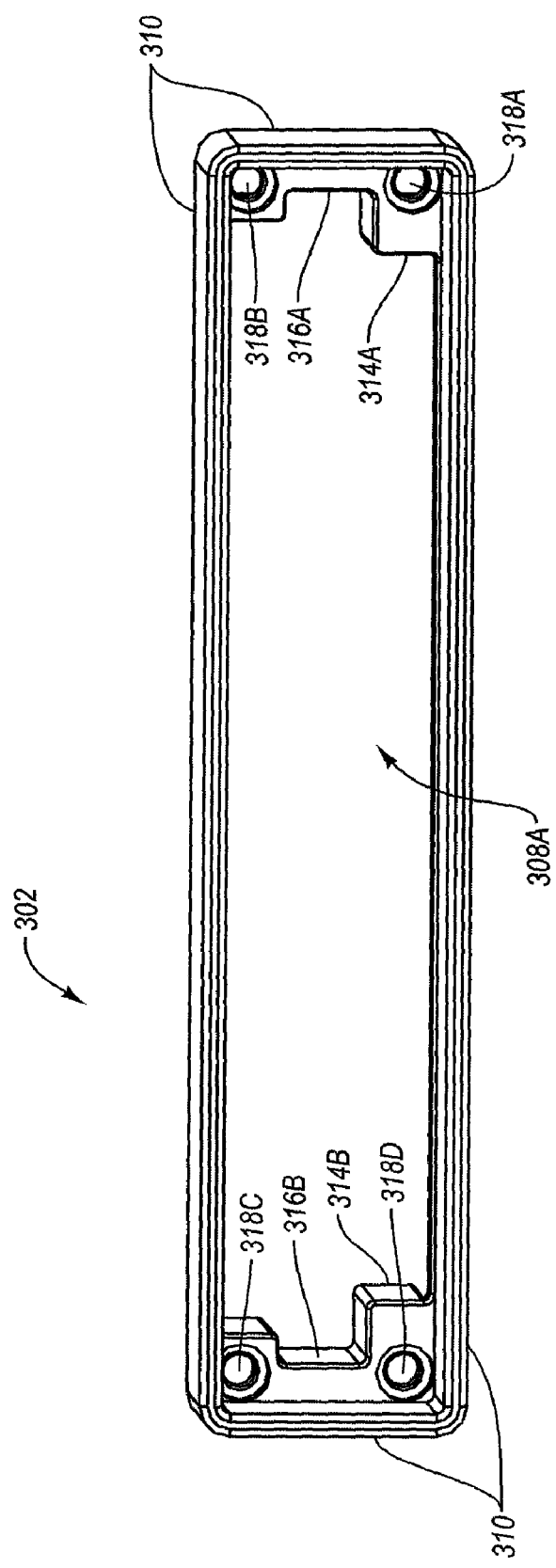
Figure 3C:
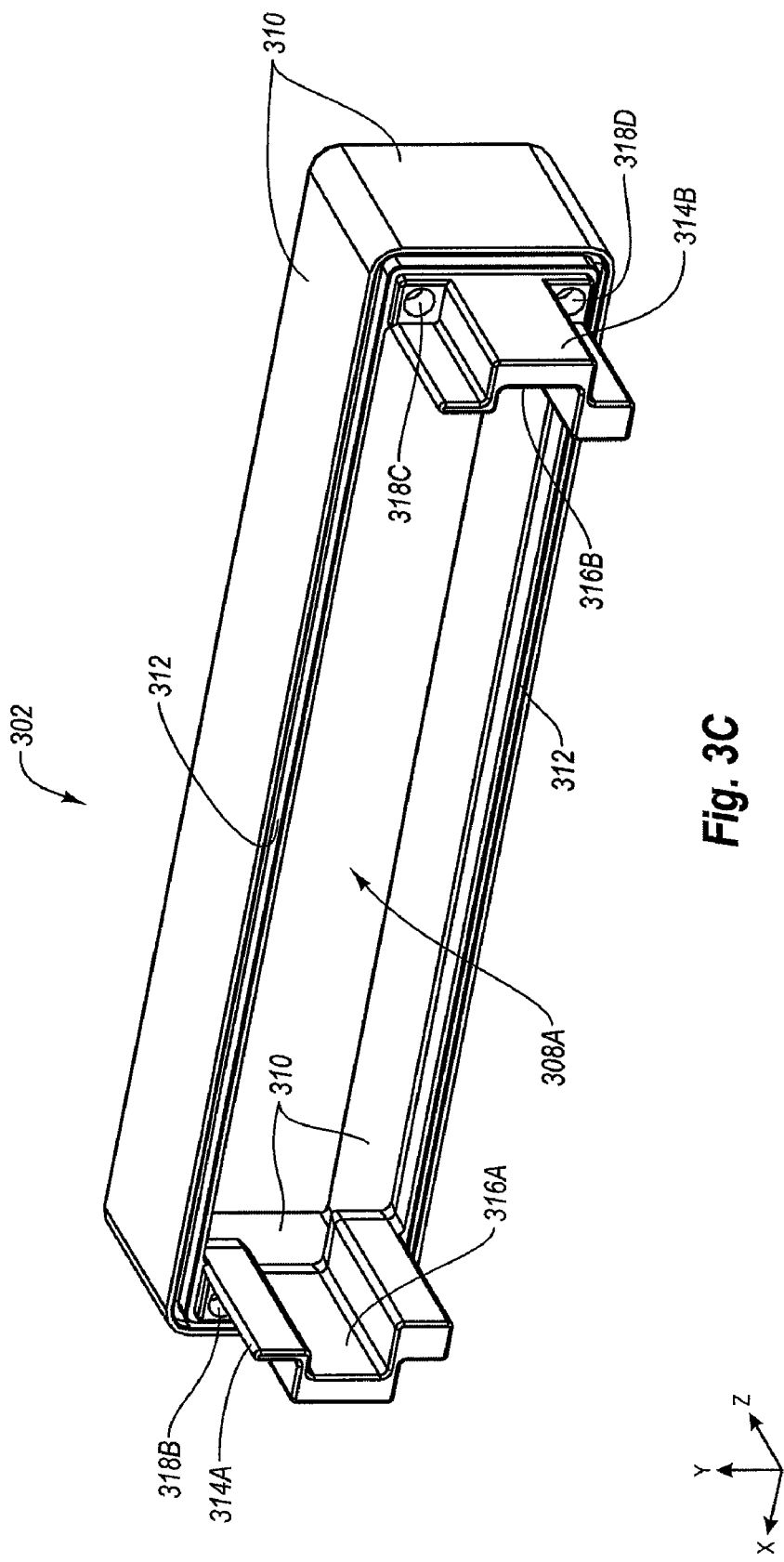

As shown in FIGS. 3B and 3C, the front bezel 302 includes a rim 310. According to some embodiments the EMI collar 218 of the module 200 is configured to contact the interior surface of the rim 310 in a wiping motion when the module 200 is inserted into the host device 102 to form an EMI shield at the interface of the front bezel 302 with the module 200. Thus, the contact formed between the EMI collar 218 and the interior surface of the rim 310 can be referred to as a "wiping contact." The wiping contact geometry between the EMI collar 218 and the interior surface of the rim 310 is configured to be tolerant of and accommodate large variations in tolerance stack-up in the pluggable module 200 in the plugging direction.

According to some embodiments of the invention, a channel 312 (FIG. 3C) is formed on the back of the rim 310. The channel 312 is configured to receive EMI gasket 304. The EMI gasket 304 is configured to form an EMI shield at the interface of the front bezel 302 with the front panel 106 and can comprise elastomeric materials or other reasonable materials.

The front bezel 302 further includes a plurality of front bezel guides 314A and 314B, each front bezel guide 314A and 314B including a guide channel 316A and 316B, respectively. The front bezel guides 314A and 314B, and more specifically, the guide channels 316A and 316B, are configured to receive the guiderails 208, 210 of module 200 and ensure that the module 200 is properly aligned with the host connector 600 and corresponding channels of host guides 500A, 500B when the module 200 is plugged into the host device 102. The front bezel guides 314A and 314B are configured to extend through the opening defined by the front panel 106 and into the opening 308B defined by the rear bezel 306 when the bezel assembly 300 is fully assembled with the front panel 106.

A plurality of through holes 318A, 318B, 318C and 318D (referred to collectively as "through holes 318") are formed at the four inside corners of the front bezel 302 where the rim 310 joins the front bezel guides 314A and 314B. Each of the through holes 318 is configured to receive a fastener, such as a screw, bolt, or the like, for coupling the front bezel 302 to rear bezel 306 through front panel 106

Although not required in all embodiments, the opening 308A defined by the front bezel 302 is asymmetric with respect to the x-axis and substantially symmetric with respect to the y-axis. The asymmetry with respect to the x-axis in this example prevents the module 200 from being inserted incorrectly into the host device 102 since the cross-section of the module 200 (not shown) is only complementary to the opening 308A in a single orientation relative to the opening 308A. Alternately or additionally, the opening 308A defined in the front bezel 302 can be substantially symmetric or asymmetric with respect to both the x-axis and the y-axis.

Figure 3D:
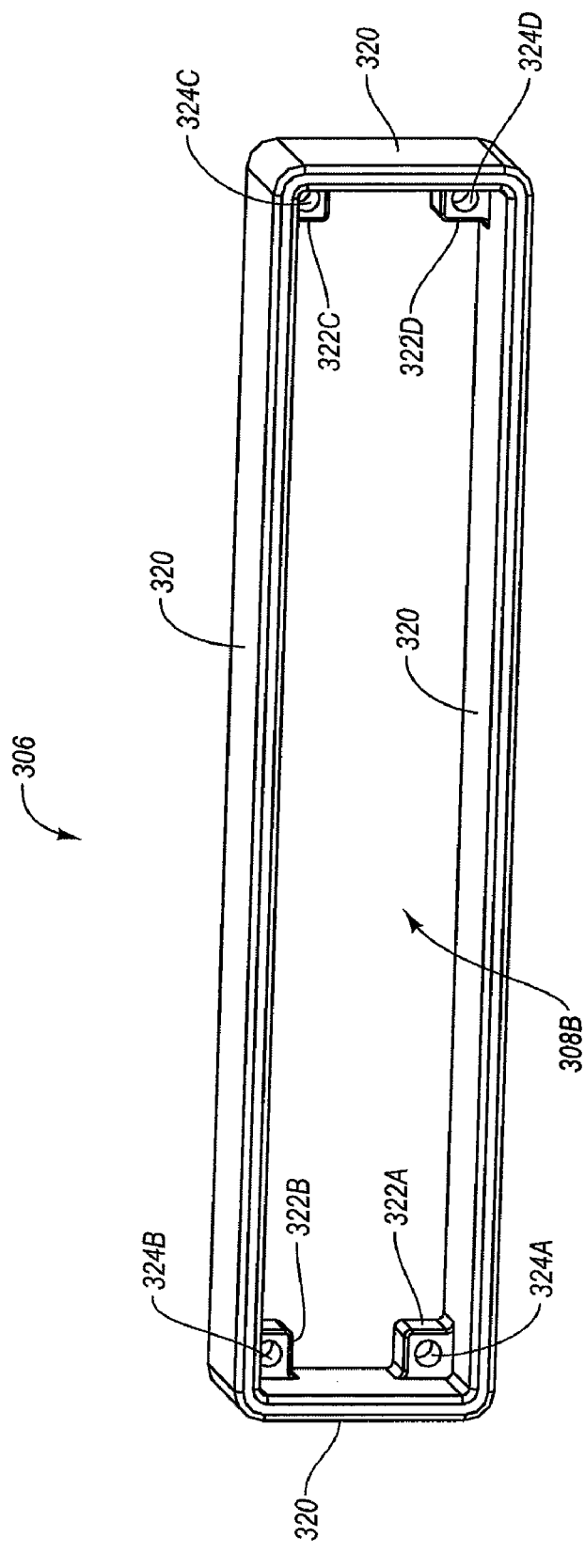

With specific reference now to FIGS. 3A and 3D, the opening 308B defined by the rear bezel 306 can be slightly larger than the opening 308A defined by the front bezel 302 in the x-direction in order to accommodate the front bezel guides 314A, 314B. Further, the rear bezel 306 includes a rim 320 and a plurality of mounting features 322A-322D disposed at front inner corners of the rear bezel 306. Each mounting feature 322A-322D defines a tapped hole 324A, 324B, 324C or 324D, respectively. As used herein, "tapped hole" refers to a through hole or a cavity that contains internal threads. The tapped holes 324A-324D are configured to receive fasteners inserted via through holes 318A-318D (FIGS. 3B and 3C), respectively, to rigidly secure the front bezel 302 to the rear bezel 306 through the front panel 106.

In some embodiments, rigidly securing the front bezel 302 to the rear bezel 306 can more uniformly compress the EMI gasket 304 compared to conventional solutions lacking a rear bezel where the front bezel is rigidly secured to host guides through the front panel. More uniform compression of the EMI gasket 304 can improve the efficiency of the EMI shield formed between front bezel 302 and front panel 106.

Alternately or additionally, use of the rear bezel 306 with the front bezel 302 can increase the rigidity of the front panel 106 compared to conventional solutions that lack a rear bezel 306. Increased rigidity of the front panel 106 can be useful, for instance, in host devices 102 configured to receive numerous densely stacked modules 200 where the numerous openings formed in the front panel 106 for receiving the modules 200 weaken and reduce the rigidity of the front panel 106.

The front bezel 302 and rear bezel 306 can be made from any reasonable material and can be die-cast, machined, or the like. Although illustrated as separate components from the front panel 106 of FIG. 1, the front bezel 302 and/or rear bezel 306 can alternately be integrally formed with the front panel 106 as a single component.

Figure 3E:
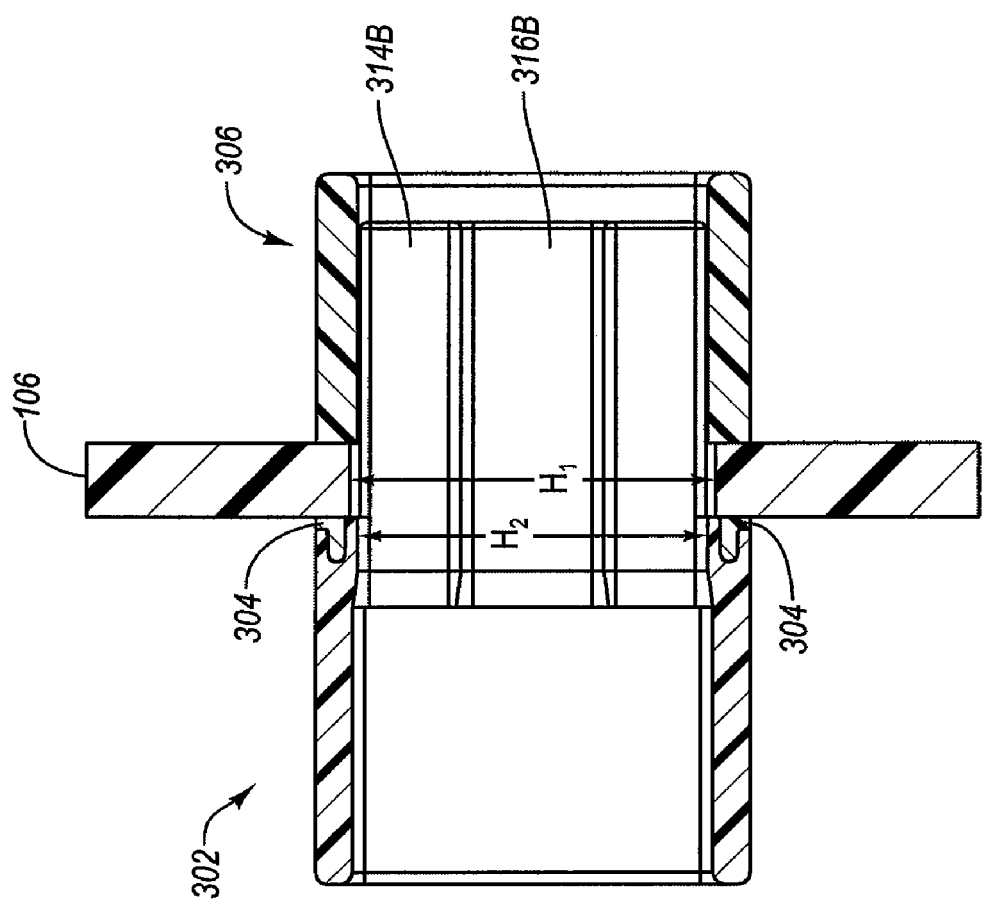

Turning to FIG. 3E, a cross-section parallel to the y-z plane of the bezel assembly 300 in an example assembled orientation relative to the front panel 106 is disclosed. As can be seen from FIG. 3E, the front panel 106 is secured between the front bezel 302 and rear bezel 306 with the EMI gasket 304 compressed between the front bezel 302 and front panel 106 to prevent leakage of EMI.

Although the front panel 106 can be secured between the front bezel 302 and rear bezel 306, the front panel 106 may nevertheless be configured to move up or down in the y-direction relative to the bezel assembly 300. In the present example, for instance, front panel 106 defines an opening height $H_1$ that is larger than an opening height $H_2$ defined by bezel assembly 300. As a result of the relatively oversized opening in the front panel 106, the y-position of the bezel assembly 300—and consequently that of the host guides 500A, 500B—can be adjusted up or down (e.g., in the positive or negative y-direction) relative to the front panel 106 to accommodate large mechanical assembly tolerances caused by thickness variation in the host PCB 400.

B. Host PCB

With combined reference to FIGS. 1-4, additional aspects of an example host PCB 400 are disclosed. As shown in FIG. 4, the host PCB 400 includes a first plurality of through holes 402A-402H configured to receive a plurality of posts for positioning the host guides 500A, 500B and host connector 600 on the host PCB 400 during assembly and a second plurality of through holes 404A-404F configured to receive fasteners to secure the host guides 500A, 500B and host connector 600 to the host PCB 400.

A plurality of contact pads 406 are disposed on the host PCB 400 and are configured to be electrically coupled to corresponding contacts of the host connector 600.

To accommodate length variations in the PCB 400 due to mechanical tolerances of the PCB 400 in the plugging direction, the host PCB 400 is configured to float in the plugging direction relative to the front panel 106 and bezel assembly 300, rather than being rigidly coupled to the front panel 106 and/or bezel assembly 300. In this embodiment, the host PCB 400 includes a cutout 408 configured to accommodate the rear bezel 306 of bezel assembly 300. The implementation of rear bezel 306 together with the host guides 500A, 500B can allow the host PCB 400 to float in the plugging direction as will be described in greater detail below.

C. Host Guides

With combined reference to FIGS. 1-5B, additional aspects of example host guides 500A, 500B are disclosed. In some embodiments, both host guides 500A, 500B can be produced from the same tool, die, or the like. In other words, the host device 102 can utilize universal host guides rather than a right host guide and a left host guide. Accordingly, the host guide 500A can be substantially identical to the host guide 500B, the only difference between host guides 500A and 500B typically being their orientation on the host PCB 400 after assembly. For instance, as shown in FIG. 5A, the only difference between host guides 500A and 500B is that host guide 500B is rotated 180 degrees about the y-axis relative to host guide 500A The host guides 500A, 500B can be formed of any reasonable material, including, but not limited to, aluminum, or the like.

Each host guide 500A, 500B includes a first end 502, interconnecting portion 504, and second end 506. A channel 508 is defined along the length of the host guides 500A, 500B from the first end 502 and along the interconnecting portion 504 to the second end 506. The channels 508 of host guides 500A, 500B are configured to receive, respectively, guiderails 222, 224 of the module 200 when the module 200 is plugged into the host device 102.

Each first end 502 and second end 506 includes a plurality of alignment posts 510A-510B and 510C-510D, respectively, formed on the first end 502 and the second end 506. The alignment posts 510A-510B of host guide 500A and alignment posts 510C-510D of host guide 500B are configured to maintain the alignment of the host guides 500A, 500B with the bezel assembly 300 in the x- and y-directions. For instance, the height $H_3$ (FIG. 5B) of the alignment posts 510A-510B and 510C-510D of each host guide 500A, 500B is substantially equal to the height $H_2$ (FIG. 3E) of the opening 308 defined by the bezel assembly 300. When the host device 102 is assembled, the alignment posts 510A-510B and 510C-510D of host guides 500A and 500B, respectively, extend into the opening 308 and maintain the y-alignment of the host guides 500A, 500B and host PCB 400 with the bezel assembly 300.

The x-alignment is maintained by spacing host guides 500A and 500B on host PCB 400 such that the outside of alignments posts 510A-510B of host guide 500A and the outside of alignment posts 510C-510D of host guide 500B are a width $W_1$ apart, the width $W_1$ being substantially equal to the width of the opening 308 defined by the bezel assembly 300. Thus, when the host device 102 is assembled, alignment posts 510A-510B of host guide 500A and alignment posts 510C-510D of host guide 500B extend into the opening 308 and maintain the x-alignment of the host guides 500A and 500B with the bezel assembly 300.

Rather than the host guides 500A, 500B being rigidly attached to the front panel 106 and/or bezel assembly 300, the host guides 500A, 500B float with respect to the front panel 106 and bezel assembly 300 in the plugging direction. As already mentioned, the alignment posts 510A-510B of host guide 500A and alignment posts 510C-510D of host guide 500B are configured to extend into the opening 308 of the bezel assembly 300 to maintain alignment of the host guides 500A, 500B in the x- and y-directions, while allowing the host guides 500A, 500B to float in the plugging direction.

Figure 5A:
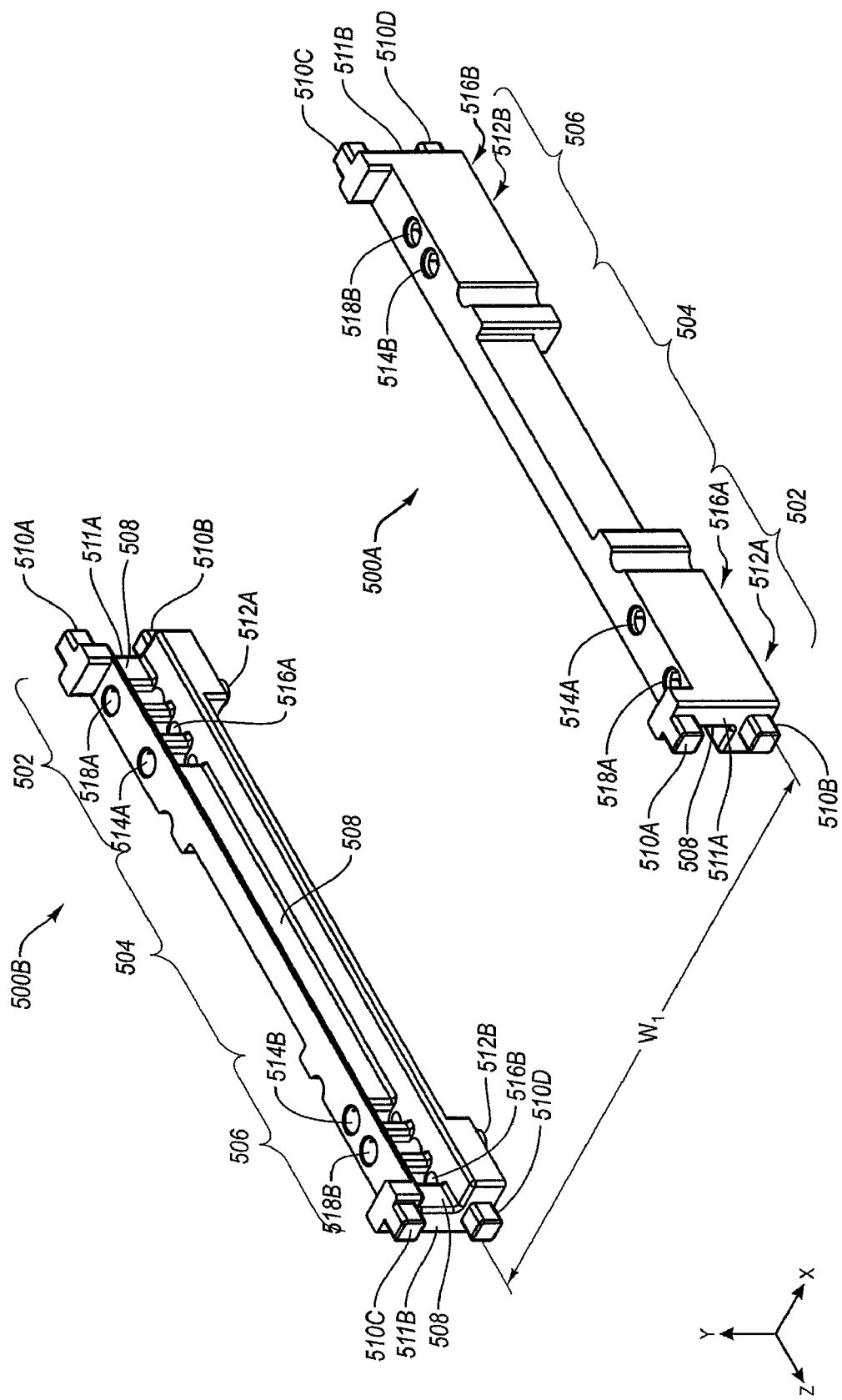
FIGS. 5A and 5B disclose example host guides that can be implemented in the host device of FIG. 1.
Figure 5B:
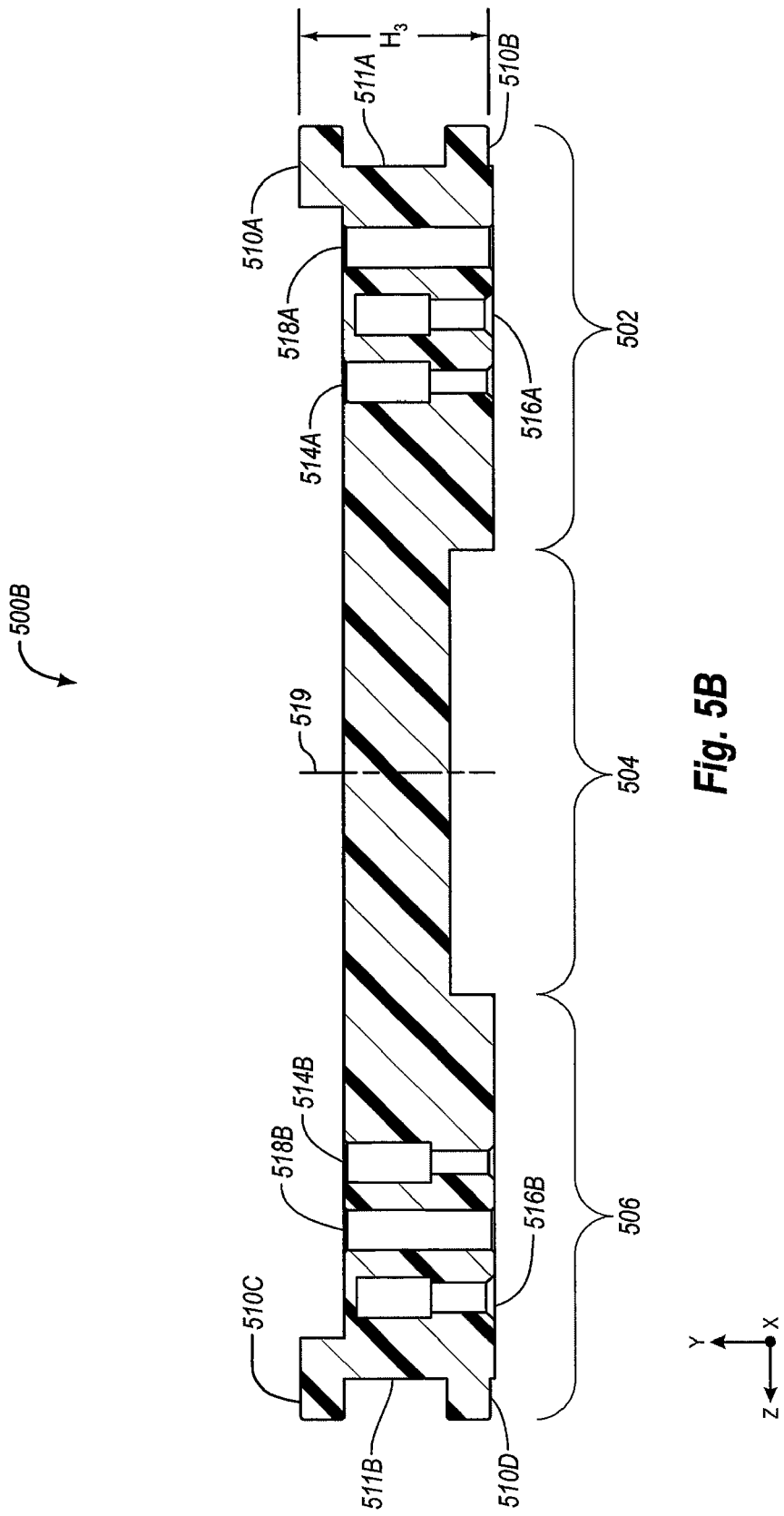

In the example of FIGS. 5A and 5B, the alignment posts 510A-510B and 510C-510D protrude, respectively, from end faces 511A and 511B. As will be explained in greater detail below with respect to FIGS. 7A and 7B, end faces 511A and 511B prevent the alignment posts 510A-510B and 510C-510D from extending into the opening 308 beyond the length of the alignment posts 510A-510B and 510C-510D.

Each of host guides 500A, 500B can optionally include one or more posts extending from the bottom of the host guides 500A and 500B, such as posts 512A and 512B on host guide 500B. Although host guide 500A similarly includes posts 512A and 512B, they are not visible in the view of FIG. 5A. The one or more posts 512A, 512B are configured to be received within one or more corresponding cavities in the host PCB 400 of FIG. 4 to help position the host guides 500A and 500B on the host PCB 400 during assembly. For example, to position the host guide 500B on the host PCB 400, posts 512A and 512B can be received, respectively, by through holes 402E and 402F. Alternately, to position the host guide 500A on the host PCB 400, posts 512A and 512B (not shown) on the host guide 500A can be received, respectively, by through holes 402A and 402B.

Each host guide 500A, 500B further includes a first plurality of tapped holes 514A and 514B extending downward from the top of the host guide 500A, 500B, a second plurality of tapped holes 516A and 516B extending upward from the bottom of the host guide 500A, 500B that are only visible for host guide 500B in FIG. 5A, and a plurality of through holes 518A and 518B extending through the host guide 500.

The first plurality of tapped holes 514A and 514B are configured to receive shoulder screws or other fasteners 108A-108D for securing the heatsink 104 to the host guides 500A, 500B. For instance, tapped holes 514A and 514B of host guide 500A are configured to receive shoulder screws 108A and 108B, respectively, while tapped holes 514A and 514B of host guide 500B are configured to receive shoulder screws 108C and 108D, respectively.

As best seen in FIG. 5B disclosing a cross-section in the y-z plane of host guide 500B, the tapped holes 514A and 514B of host guide 500B are positioned in the host guide 500B substantially symmetrically about a reference axis 519 that bisects the host guide 500B and is parallel to the y-axis. Host guide 500A is configured similar to host guide 500B with symmetrically positioned tapped holes 514A and 514B. Alternately or additionally, the tapped holes 514A and 514B can be positioned in the host guide 500B (or 500A) asymmetrically about the reference axis 519.

The second plurality of tapped holes 516A and 516B are configured to receive screws or other fasteners for securing the host guides 500A, 500B to the host PCB 400. In particular, the tapped holes 516A and 516B are configured to align with through holes on the host PCB 400 such that a screw or other fastener can be inserted through each set of aligned holes and screwed into the tapped holes 516A and 516B. For example, tapped holes 516A and 516B of host guide 500A are configured to respectively align with through holes 404A and 404B of host PCB 400 and receive screws to secure host guide 500A to host PCB 400, while tapped holes 516A and 516B of host guide 500B are configured to respectively align with through holes 404E and 404F and receive screws to secure host guide 500B to host PCB 400.

As shown in FIG. 5B, the tapped holes 516A and 516B of host guide 500B are positioned asymmetrically about the reference axis 519. Host guide 500A is configured similar to host guide 500B with asymmetrically positioned tapped holes 516A and 516B.

Through holes 518A and 518B of host guides 500A, 500B are also positioned asymmetrically about reference axis 519. Notably, however, through hole 518A and tapped hole 516B of host guide 500B are positioned substantially symmetrically about the reference axis 519 while through hole 518B and tapped hole 516A of host guide 500B are also positioned substantially symmetrically about the reference axis 519. Host guide 500A is configured similar to host guide 500B with positional symmetry between through hole 518A and tapped hole 516B and between through hole 518B and tapped hole 516A. The symmetry about the reference axis 519 of each through hole 518A and 518B with a corresponding one of the tapped holes 516B and 516A, respectively, allows the host guides 500A, 500B to be used in belly-to-belly configurations where a host device 102 is configured to receive a first module 200 on top of the host PCB 400 and a second module 200 in an upside-down orientation immediately beneath the first module 200 on the bottom of the host PCB 400.

For instance, in a belly-to-belly configuration, tapped holes 516A and 516B of an upper host guide 500A respectively align with through holes 518B and 518A of an upside-down lower host guide 500B through host PCB 400. The alignment of the tapped holes 516A and 516B of the upper host guide 500A with the through holes 518B and 518A of the upside-down lower host guide 500B allows both upper host guide 500A and upside-down lower host guide 500B to be secured to the host PCB 400 using the same number of screws or other fasteners as required to secure a single host guide to the PCB 400. In particular, a first screw can be inserted through the through hole 518B of the upside-down lower host guide 500B, through the host PCB 400, and into the tapped hole 516A of the upper host guide 500A; a second screw can be inserted through the through hole 518A of the upside-down lower host guide 500B, through the host PCB 400, and into the tapped hole 516B of the upper host guide 500A. In comparison, however, the two screws used in the belly-to-belly configuration may be longer than the two screws used in the single-sided configuration.

Additional aspects regarding universal host guides that can be implemented in CFP mechanical platforms are disclosed in the '027 application incorporated herein by reference.

D. Host Connector

Figure 6:
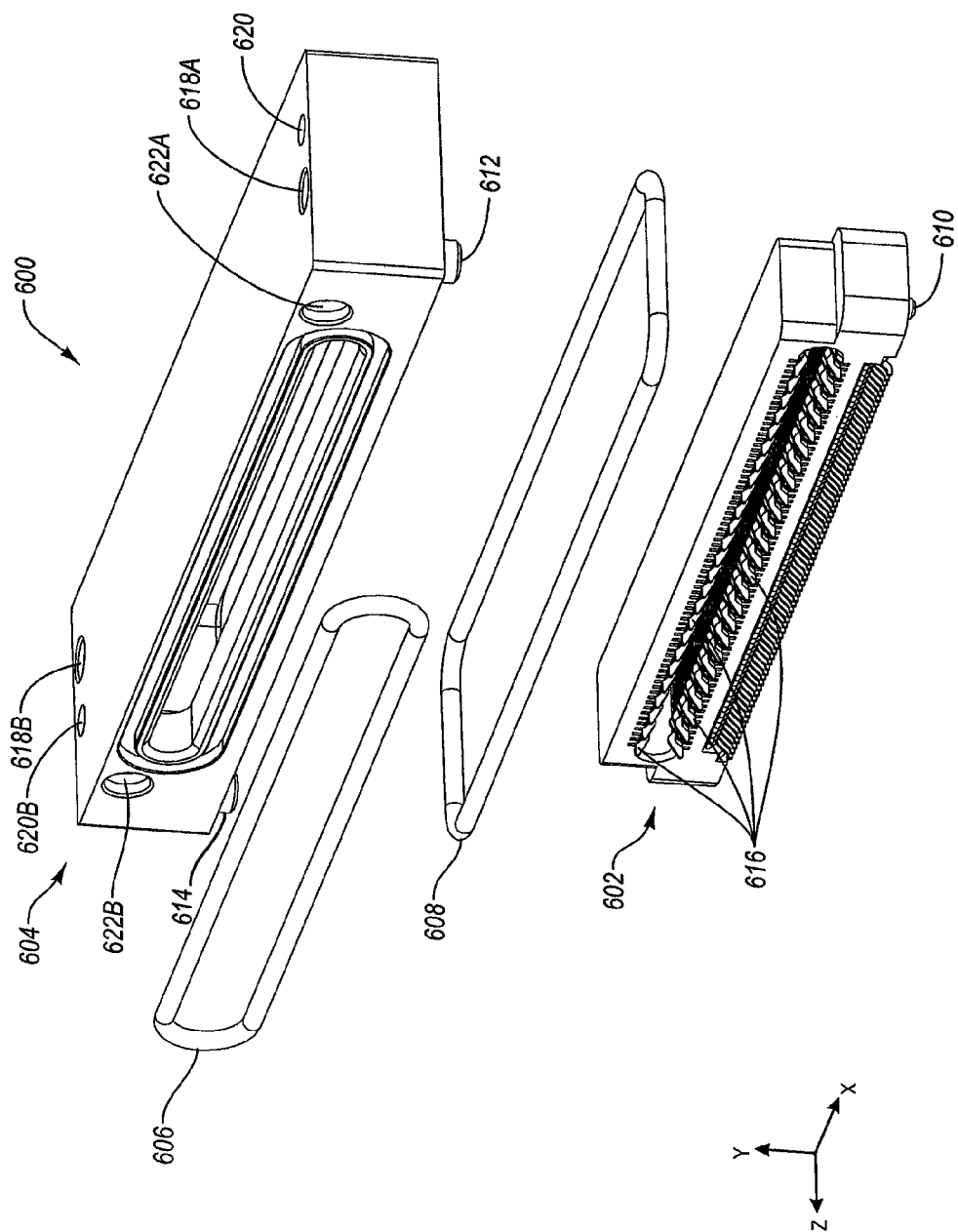
FIG. 6 discloses an example host connector such as may be employed in the host device of FIG. 1.

With combined reference to FIGS. 1-6, additional aspects of an example host connector 600 are disclosed. The host connector 600 is coupled to the host PCB 400 and is configured to provide an electrical interface between the module 200 and the host PCB 400. As shown in FIG. 6, the host connector 600 includes a connector core 602 defining a recessed slot for receiving a connector of the module 200, a one-piece connector cover 604 defining a cavity configured to receive the connector core 602, and a plurality of EMI gaskets 606, 608, one each disposed on a front face and bottom face of the connector cover 604 to form EMI shields at interfaces of the host connector 600 with the module 200 and host PCB 400.

Each of the connector core 602 and connector cover 604 can include one or more posts 610, 612, 614 configured to be received in through holes 402C, 402D, 402G on the host PCB 400 for properly aligning the connector core 602 and connector cover 604 with the host PCB 400 during assembly. The connector core 602 includes a plurality of contacts 616 configured to be electrically coupled to the contact pads 406 of the host PCB 400. The contacts 616 can be partially enclosed within a plurality of chicklets, each chicklet enclosing two contacts 616. The chicklets can include cutaway profiles to provide solder joint visibility during assembly.

Similar to the host guides 500A and 500B, a plurality of asymmetrically positioned through holes 618A, 618B and asymmetrically positioned tapped holes 620A, 620B can be defined in the connector cover 604 to allow the host connector 600 to be used in belly-to-belly configurations with duplicates of itself. The connector cover 604 further includes a second plurality of tapped holes 622A, 622B configured to receive thumbscrews 212, 214 for securing the module 200 directly to the host connector 600.

In some embodiments, the front face of connector cover 604 acts as a hard stop within the host device 102 for the module 200. Further, the tapped holes 622A, 622B allow the module 200 to be directly fastened to the connector cover 604 via thumbscrews 212, 214. Direct fastening of the module 200 to the host connector 600 protects the connector core 602 from mechanical damage caused by external stress in some embodiments. Alternately or additionally, directly securing the module 200 to the host connector 600 can reduce tolerance stack-up between the host connector 600 and corresponding module connector and can allow use of an elastomeric EMI gasket 606 at the interface of the module 200 with the host connector 600, in contrast to conventional mechanical platforms where the pluggable module is directly secured to the front panel of the host device.

Additional aspects regarding example host connectors that can be implemented in CFP mechanical platforms are disclosed in the '027 application incorporated herein by reference.

III. Floating Host PCB

Figure 7A:
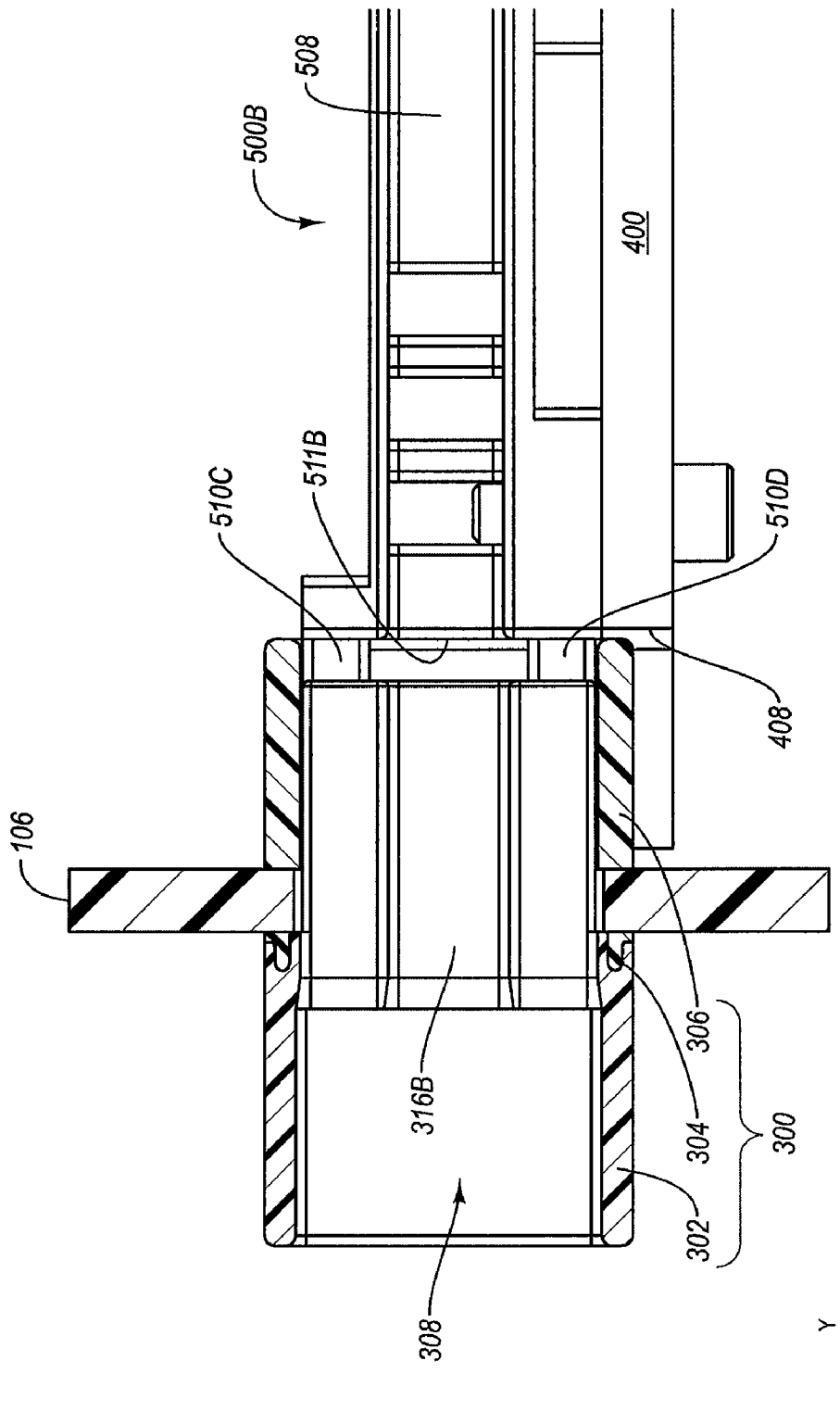
FIGS. 7A and 7B disclose additional aspects of the host device of FIG. 1.
Figure 7B:
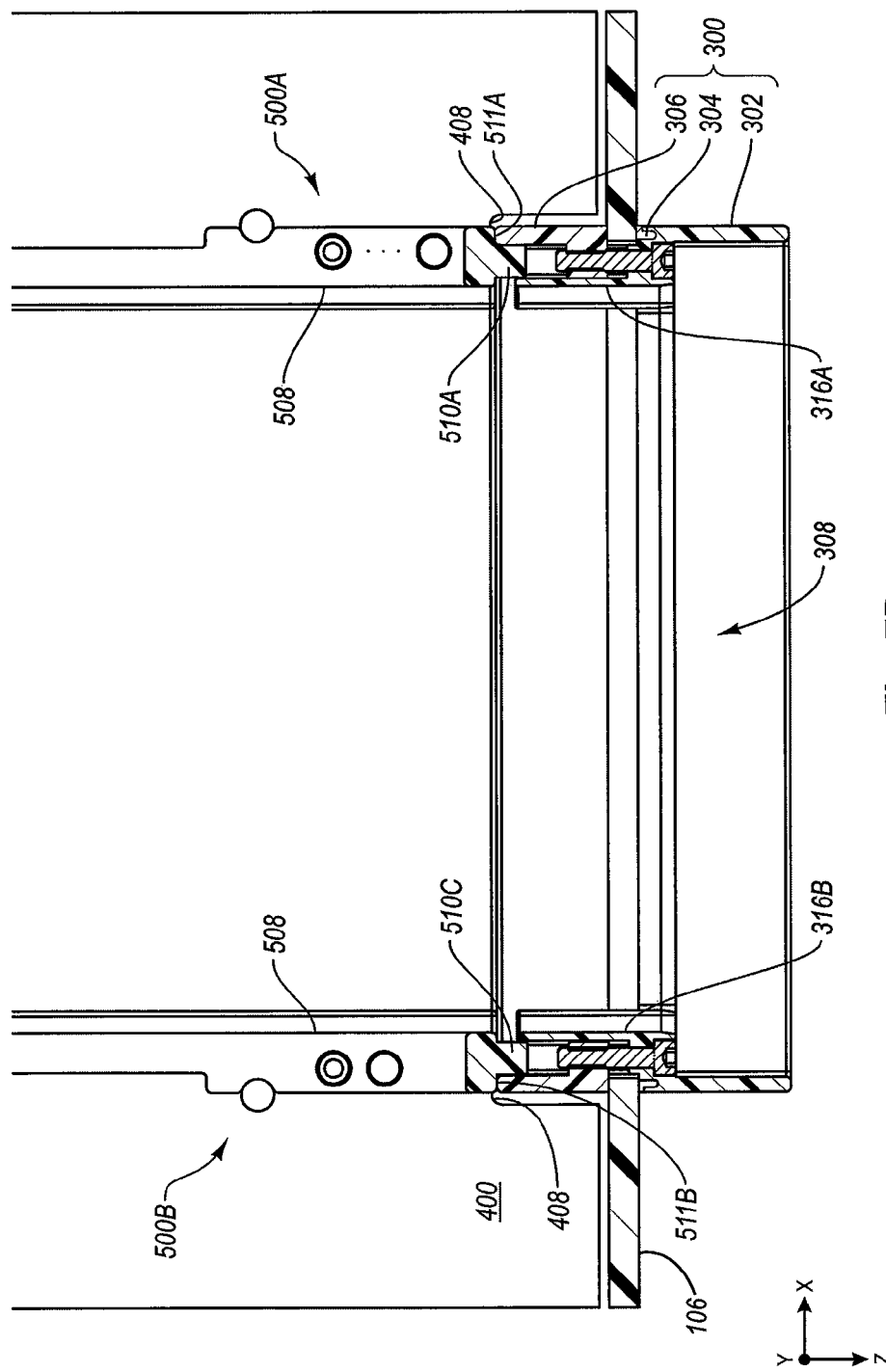

Turning now to FIGS. 7A and 7B, additional aspects of some example embodiments are disclosed. FIGS. 7A and 7B illustrate two cross-sectional views of the front panel 106, bezel assembly 300, host PCB 400, and host guides 500A, 500B in an assembled configuration. FIG. 7A is a cross-section parallel to the y-z plane while Figure 7B is a cross-section parallel to the x-z plane.

As shown in FIGS. 7A and 7B, the guide channels 316A, 316B of front bezel 302 align with channels 508 of host guides 500A, 500B, respectively, in both the x- and y-directions. Accordingly, when the module 200 is plugged into the host device 102, guiderail 208 engages guide channel 316A of front bezel 302 followed by channel 508 of host guide 500A. Similarly, guiderail 210 engages guide channel 316B of front bezel 302 followed by channel 508 of host guide 500B.

As already mentioned above, the host PCB 400 is configured to float in the plugging direction with respect to the front panel 106 and bezel assembly 300, rather than being rigidly secured to the front panel 106 and/or bezel assembly 300. In some embodiments, the rear bezel 306 facilitates the floating of the host PCB 400. In particular, the rear bezel 306 is configured to receive alignment posts 510A-510B of host guide 500A and alignment posts 510C-510D of host guide 500B into opening 308B defined by rear bezel 306.

The alignment posts 510A-510B and 510C-510D of host guides 500A, 500B are configured to partially extend into the opening 308B at the four corners of opening 308B. However, the alignment posts 510A-510B, 510C-510D do not rigidly secure the host guides 500A, 500B to the bezel assembly 300. Rather, the alignment posts 510A-510B, 510C-510D allow the host guides 500A, 500B—and consequently, the host PCB 400 to which the host guides 500A, 500B are rigidly secured—to float in the plugging direction, while maintaining the alignment of the host guides 500A, 500B and host PCB 400 with the bezel assembly 300 in the x- and y-directions.

For example, as best seen in FIG. 7A, the alignment posts 510C-510D of host guide 500B are spaced apart in the y-direction such that they fit just inside the opening 308 in the y-direction to maintain alignment of the host guide 500B and host PCB 400 with the bezel assembly 300 in the y-direction. Although not shown in FIG. 7A, the alignment posts 510A-510B of host guide 500A are similarly spaced apart in the y-direction such that they fit just inside the opening 308 in the y-direction to maintain alignment of the host guide 500A and host PCB 400 with the bezel assembly 300 in the y-direction.

As best seen in FIG. 7B, the alignment post 510A of host guide 500A and alignment post 510C of host guide 500B are spaced apart in the x-direction such that they fit just inside the opening 308 in the x-direction to maintain alignment of the host guides 500A, 500B and host PCB 400 with the bezel assembly 300 in the x-direction. Although not shown in FIG. 7B, the alignment post 510B of host guide 500A and alignment post 510D of host guide 500B are similarly spaced apart in the x-direction such that they fit just inside the opening 308 in the x-direction to maintain alignment of the host guides 500A, 500B and host PCB 400 with the bezel assembly 300 in the x-direction.

Due to manufacturing tolerances, in some example embodiments host PCBs implemented in the host device 102 may be relatively longer or shorter in the plugging direction than the host PCB 400 illustrated in FIGS. 7A-7B. In conventional mechanical platforms, a relatively longer host PCB that is rigidly secured to the front panel tends to bow the front panel outwards, while a relatively shorter host PCB that is rigidly secured to the front panel tends to bow the front panel inwards.

In contrast, embodiments of the invention allow the host PCB 400 to float in the plugging direction with respect to the front panel 106 and bezel assembly 300. Consequently, a relatively longer host PCB 400 rigidly secured to host guides 500A, 500B can float forwards in the plugging direction up until the end faces 511A and 511B of host guides 500A and 500B contact the rear bezel 306, as shown in FIG. 7B. Alternately or additionally, a relatively shorter host PCB 400 rigidly secured to host guides 500A, 500B can float as far backwards in the plugging direction as necessary so long as a portion of each alignment post 510A-510B and 510C-510D extends into the opening 308 to maintain x- and y-alignment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A host device for receiving a pluggable electronic or optoelectronic module, comprising:
   a front panel defining an opening configured to receive a pluggable module in a plugging direction;
   a bezel assembly defining an opening configured to align with the front panel opening and to receive the pluggable module, the bezel assembly rigidly secured to the front panel;
   a floating printed circuit board disposed behind the front panel; and
   a first host guide and a second host guide rigidly secured to the floating printed circuit board and configured to guide the pluggable module when plugged into the host device, the first and second host guides and the bezel assembly operating together to allow the floating printed circuit board to float with respect to the front panel in the plugging direction while remaining substantially aligned with the front panel in directions normal to the plugging direction.

2. The host device of claim 1, wherein the opening defined by the bezel assembly is asymmetric and is complementary to a cross-section of the pluggable module such that the pluggable module can only be received through the asymmetric opening in a single orientation.

3. The host device of claim 1, wherein the bezel assembly comprises a front bezel extending forward from the front of the front panel, an electromagnetic interference gasket configured to form an electromagnetic shield between the front bezel and the front panel, and a rear bezel extending backward from the back of the front panel.

4. The host device of claim 3, wherein the front bezel includes a first front bezel guide and a second front bezel guide, each of the first and second front bezel guides including a guide channel, the guide channels configured to receive first and second guiderails of the pluggable module.

5. The host device of claim 4, wherein the first and second front bezel guides extend through the front panel opening and into an opening defined by the rear bezel.

6. The host device of claim 4, further comprising:
   a plurality of through holes formed at four inside corners of the front bezel; and
   a plurality of tapped holes formed at four inside corners of the rear bezel;
   wherein the plurality of tapped holes are configured to align with the plurality of through holes, each of the plurality of tapped holes configured to receive a fastener inserted through a corresponding one of the plurality of through holes to rigidly secure the front panel between the front bezel and the rear bezel.

7. The host device of claim 3, wherein the printed circuit board includes a cutout configured to accommodate the rear bezel.

8. The host device of claim 1, further comprising a first plurality of alignment posts formed at a front end of the first host guide and a second plurality of alignment posts formed at a front end of the second host guide, the first and second plurality of alignment posts configured to extend in the plugging direction into the bezel assembly opening at four inside corners of the bezel assembly opening to maintain alignment of the printed circuit board with the front panel in directions normal to the plugging direction.

9. A host device for receiving a pluggable optoelectronic module, comprising:
   a front bezel including a first front bezel guide and a second front bezel guide, each of the first and second front bezel guides including a guide channel configured to receive a first or second guiderail of a pluggable module inserted through the front bezel in a plugging direction;
   a rear bezel rigidly secured to the front bezel, the front and rear bezel forming a first opening configured to receive the pluggable module;
   a front panel rigidly secured between the front bezel and the rear bezel, the front panel defining a second opening aligned with the first opening;
   a printed circuit board configured to float in the plugging direction with respect to the front panel; and
   a first host guide and a second host guide rigidly secured to the printed circuit board, the first host guide defining a first channel and the second host guide defining a second channel, the first and second channels configured to receive the first and second guiderails of the pluggable module;
   wherein the first and second host guides and rear bezel operate together to allow the printed circuit board to float with respect to the front panel in the plugging direction while remaining substantially aligned with the front panel in directions normal to the plugging direction.

10. The host device of claim 9, wherein the second opening is larger than the first opening to accommodate mechanical assembly tolerances caused by thickness variation in the printed circuit board.

11. The host device of claim 9, wherein the first host guide is substantially identical to the second host guide except in orientation relative to the printed circuit board.

12. The host device of claim 9, further comprising a host connecter coupled to the printed circuit board and configured to provide an electrical interface between the pluggable module and the printed circuit board, the host connector including a plurality of tapped holes configured to receive thumbscrews for securing the pluggable module directly to the host connector.

13. The host device of claim 9, wherein the host device and pluggable module are substantially compliant with the 100G form-factor pluggable ("CFP") multi-source agreement ("MSA").

14. The host device of claim 9, wherein the pluggable module includes an electromagnetic interference collar surrounding the pluggable module at a front end of the pluggable module, the electromagnetic interference collar configured to operate in conjunction with an inner surface of the front bezel to create an electromagnetic interference shield around the front of the pluggable module when plugged into the host device.

15. The host device of claim 14, wherein the electromagnetic interference collar and front bezel are further configured to accommodate tolerance stack-up in the pluggable module in the plugging direction.

16. The host device of claim 9, wherein the first guiderail extends from a first side of the pluggable module and the second guiderail extends from a second side opposite the first side of the pluggable module.

* * * * *